United States Patent

Strain et al.

[15] 3,684,295

[45] Aug. 15, 1972

[54] MAGNETIC TAPE MACHINE FOR MAGNETIC TAPE CARTRIDGES

[72] Inventors: William H. Strain, Santa Monica; Peter G. Moore, Venice, both of Calif.

[73] Assignee: Wescal Industries, Inc., El Segundo, Calif.

[22] Filed: April 10, 1970

[21] Appl. No.: 27,402

[52] U.S. Cl. ....................274/4 C

[51] Int. Cl. ....................G11b 5/10

[58] Field of Search....274/4 R, 4 B, 4 C, 11 B, 11 C; 242/197–200

[56] References Cited

UNITED STATES PATENTS

| | | | |
|---|---|---|---|
| 3,421,767 | 1/1969 | Atsumi | 274/4 R |
| 3,417,938 | 12/1968 | Markakis et al. | 274/11 C |
| 3,285,610 | 11/1966 | Shields | 274/4 C |
| 3,460,782 | 8/1969 | Findeisen | 242/200 |

FOREIGN PATENTS OR APPLICATIONS

| | | | |
|---|---|---|---|
| 866,351 | 4/1961 | Great Britain | 274/4 D |

*Primary Examiner*—Harry N. Haroian
*Attorney*—Forrest J. Lilly

[57] ABSTRACT

A magnetic tape machine for use with a tape cartridge having an exposed transcribing run of magnetic tape and a brake for the tape reels. The tape machine has a tape deck mounting a pair of motor driven spindles for drivably engaging the cartridge reels, a capstan drive and a magnetic transcriber including tape-engaging members for straddling the exposed run of cartridge tape, and a cartridge brake release mechanism including a brake operating member for releasing the cartridge brake. A cover hinged to the tape deck is operatively connected to the capstan drive, magnetic transcriber, and brake release mechanism in a manner such that opening the cover separates the tape-engaging members of the capstan drive and magnetic transcriber and retracts the brake operating member to facilitate insertion and removal of the tape cartridge, and closing the cover returns these members to normal position to lock the cartridge in place, release the cartridge brake mechanism, and condition the capstan drive and magnetic transcriber for operation.

11 Claims, 5 Drawing Figures

INVENTORS
WILLIAM H. STRAIN
PETER G. MOORE
BY [signature]
ATTORNEY

INVENTORS
WILLIAM H. STRAIN
PETER G. MOORE
BY [signature]
ATTORNEY

INVENTORS
WILLIAM H. STRAIN
PETER G. MOORE
BY [signature]
ATTORNEY

INVENTORS
WILLIAM H. STRAIN
PETER G. MOORE
BY [signature]
ATTORNEY

MAGNETIC TAPE MACHINE FOR MAGNETIC TAPE CARTRIDGES

BACKGROUND OF THE INVENTION

1. Field of the Invention

This invention relates generally to magnetic tape recording and play-back machines. More particularly, the invention relates to such a magnetic tape machine which is designed for use with a magnetic tape cartridge and is uniquely constructed and arranged to facilitate cartridge insertion and removal.

2. Prior Art

Magnetic tape machines of the type which employ magnetic tape cartridges are currently favored by widespread use for both audio and data recording and playback applications. A typical magnetic tape cartridge for such a tape machine has an outer, generally rectangular cartridge case containing a pair of tape reels spaced longitudinally of the case. Also contained within the cartridge case is a magnetic tape having its ends secured to and wound on the reels. The tape extends from one reel to the other along a prescribed path of motion which provides an exposed transcribing run of tape along the front edge of the cartridge. Pivotally mounted within the rear portion of the cartridge case are a pair of spring loaded brake levers having ends engaging the tape reels to frictionally restrain the reels against turning. The opposite ends of the brake levers are disposed in overlapping relation opposite an opening in the rear edge of the cartridge case. Inward or forward pressure exerted on these overlapping ends retracts the brake levers out of contact with the tape reels to release the reels for free rotation.

A typical magnetic tape machine for such a tape cartridge has a tape deck including a pair of spaced motor driven spindles. Mounted on the tape deck at one side of the plane containing the rotation axes of these spindles are a capstan drive and a magnetic transcriber. The capstan drive has a motor driven capstan roller and an opposing pinch roller. The transcriber has a magnetic head and an opposing pinch pad. Within the region between the spindles and the capstan drive and transcriber are a pair of spring-loaded tape tensioning rollers movable toward and away from one another. Mounted on the tape deck at the opposite side of the spindles is an upstanding cartridge brake release stop.

The tape machine receives the tape cartridge in a transcribing position wherein the cartridge case seats flat against the tape deck. In this position, the tape deck spindles drivably engage the cartridge reels, the exposed run of cartridge tape is positioned between the rollers of the capstan drive and the magnetic head and pinch pad of the magnetic transcriber, and the cartridge brake release stop engages and presses forwardly against the cartridge brake levers to release the cartridge reels for free rotation. The front and rear edges of the cartridge engage under front and rear cartridge retaining flanges on the tape deck. These flanges retain the cartridge in its transcribing position.

Installation of the tape cartridge in the tape machine is accomplished by locating the cartridge in an inclined attitude over the tape deck in such a way that the rear of the cartridge slopes toward the deck. The cartridge is then moved rearwardly, in its edgewise direction, to an initial position wherein the rear edge of the cartridge engages under the rear cartridge retaining flange and the cartridge brake release stop engages and presses forwardly against the cartridge brake levers to release the cartridge reels. Finally, the front of the cartridge is rotated toward the tape deck and released. During final rotation of the cartridge toward the tape deck, the tape deck spindles enter into driving engagement with the cartridge reels, the exposed run of cartridge tape enters between the rollers of the capstan drive and between the magnetic head and pinch pad of the magnetic transcriber, and the tape tensioning rollers enter the interior of the cartridge through slots in the adjacent cartridge side wall. When the cartridge is released following its final rotation toward the tape deck, the currently tensioned cartridge brake springs urge the cartridge forwardly to locate the front edge of the cartridge case under the front cartridge retaining flange. After installation of the cartridge in the tape machine, the tape tensioning rollers are moved outwardly into engagement with the cartridge tape. These rollers serve the dual function of helping to maintain a generally uniform tension in the tape and preventing excessive tape tension during rapid starting and stopping of the tape. The tape cartridge is removed from the tape machine by reversing the procedure outlined above.

The existing cartridge tape machines have certain inherent deficiencies which detract from their usefulness. Certain of these deficiencies involve the tape tensioning mechanism including the tensioning rollers referred to above. Other deficiencies are concerned with installation and removal of the tape cartridge. The invention disclosed in the earlier mentioned copending application concerns itself with curing the problems associated with the tape tensioning mechanism. Accordingly, these problems will not be treated in the present disclosure. It should be noted in this regard, however, that the present invention will be disclosed in connection with a magnetic tape machine and tape cartridge embodying the copending invention.

The present invention is concerned with curing the problems associated with installation and removal of the tape cartridge. These problems result from the fact that the spacing between the rollers of the capstan drive and the spacing between the magnetic head and pinch pad of the magnetic transcriber during installation and removal of the tape cartridge are relatively narrow, and the cartridge brake release stop and cartridge retaining flanges are fixed. This arrangement complicates installation and removal of the cartridge. Thus, because of the fixed position of the brake release stop and retaining flanges, it is necessary to maneuver the tape cartridge in the rather involved manner explained earlier during installation and removal of the cartridge in the tape machine. Moreover, during installation, accurate alignment must be maintained between the exposed run of the cartridge tape and the narrow tape receiving gaps between the rollers of the capstan drive and between the magnetic head and pinch pad of the magnetic transcriber in order to assure proper entrance of the tape into these gaps. At the same time, the cartridge must be properly aligned relative to the spindles and tensioning rollers on the tape deck to assure proper mating of the spindles with the cartridge reels and proper entrance of the tensioning rollers into the cartridge side wall slots. Finally, the front and rear edges of the cartridge must be properly engaged under the cartridge retaining flanges on the tape deck to assure proper locking of the cartridge in place on the deck.

As a consequence of these several requirements, installation and removal of a tape cartridge in the existing tape machines must be performed with great care. This cartridge installation and removal procedure is not only difficult to accomplish, but requires substantial time. While the ease and speed with which a tape cartridge may be installed and removed is perhaps not too significant in some applications, these factors are quite significant in the case of many other applications, notably commercial data processing equipment.

SUMMARY OF THE INVENTION

The present invention avoids the above problems associated with the existing magnetic tape machines by providing an improved cartridge tape machine wherein the tape-engaging members of the capstan drive and magnetic transcriber may be relatively retracted away from one another to cartridge loading positions, wherein a relatively wide gap exists between the respective members. The brake operating member of the cartridge brake release mechanism is retractable to a cartridge loading position, wherein this operating member clears the tape cartridge. When the tape engaging members and the brake operating member are thus retracted to cartridge loading position, a tape cartridge may be quickly and easily installed in the machine by simple dropping the cartridge into place over the tape deck spindles. After installation of the cartridge, the tape-engaging members and the brake operating member are returned to their normal operating positions to condition the tape machine for operation.

According to another important feature of the invention, the capstan drive, magnetic transcriber, and brake release mechanism are interconnected for extension and retraction of their respective members in unison between their operating and cartridge loading positions by a single actuating motion. In the disclosed embodiment of the invention, for example, the capstan drive, magnetic transcriber, and brake operating mechanism are operatively connected to a hinged cover on the tape deck. Opening this cover retracts the tape engaging members and brake operating member in unison to permit insertion and removal of the tape cartridge. Closing the cover returns the members to their normal operating positions in unison to condition the tape machine for transcribing operation. The cover and the brake operating member are provided with cartridge hold-downs which engage over the front and rear edges of the cartridge when the cover is closed to retain the cover in place on the tape deck. Opening of the cover retracts these hold-downs in unison to free the cartridge for removal from the tape machine.

DESCRIPTION OF THE PREFERRED EMBODIMENT

Figure 1:
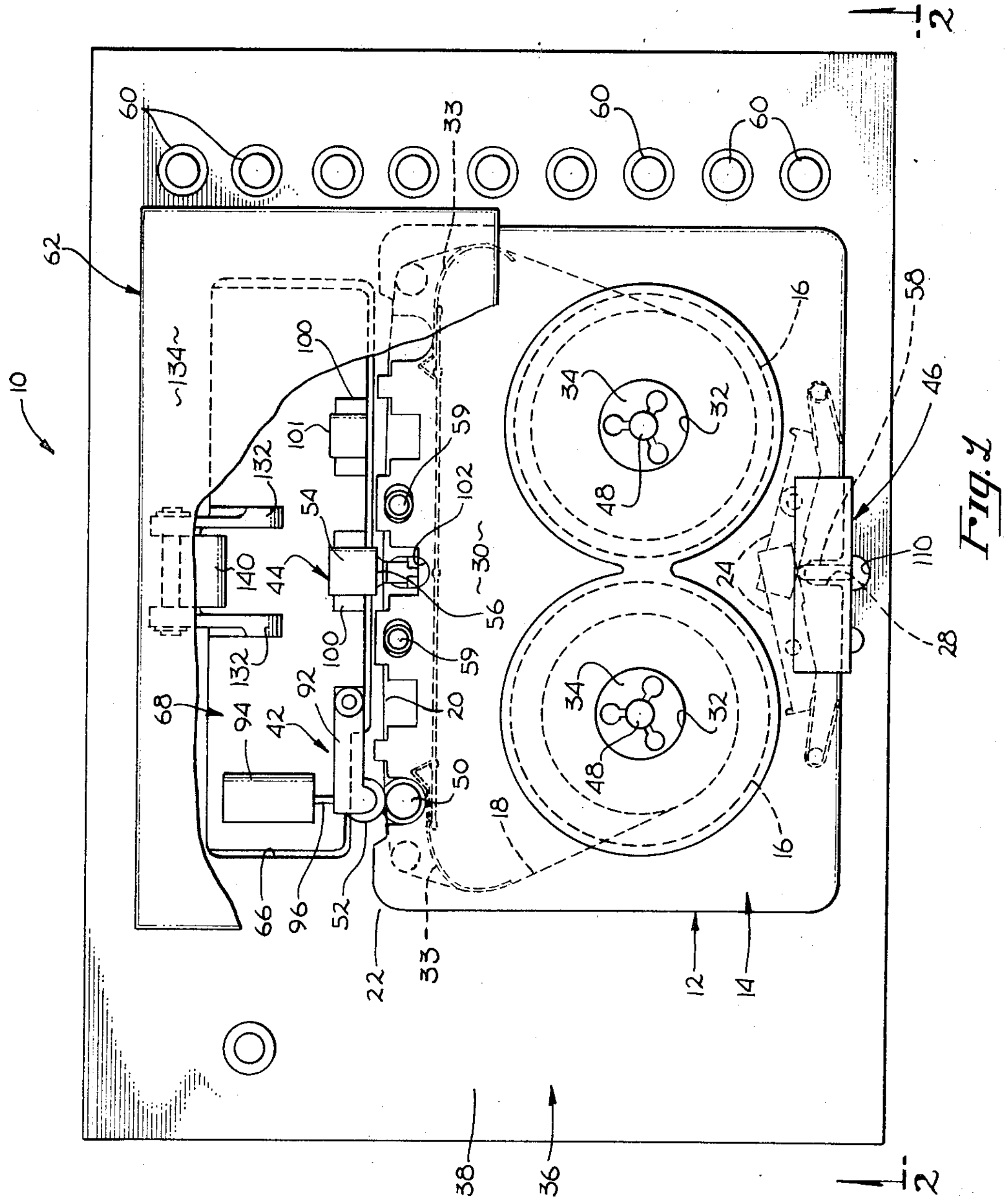
FIG. 1 is a plan view of a magnetic tape machine according to the invention.
Figures 2, 3:
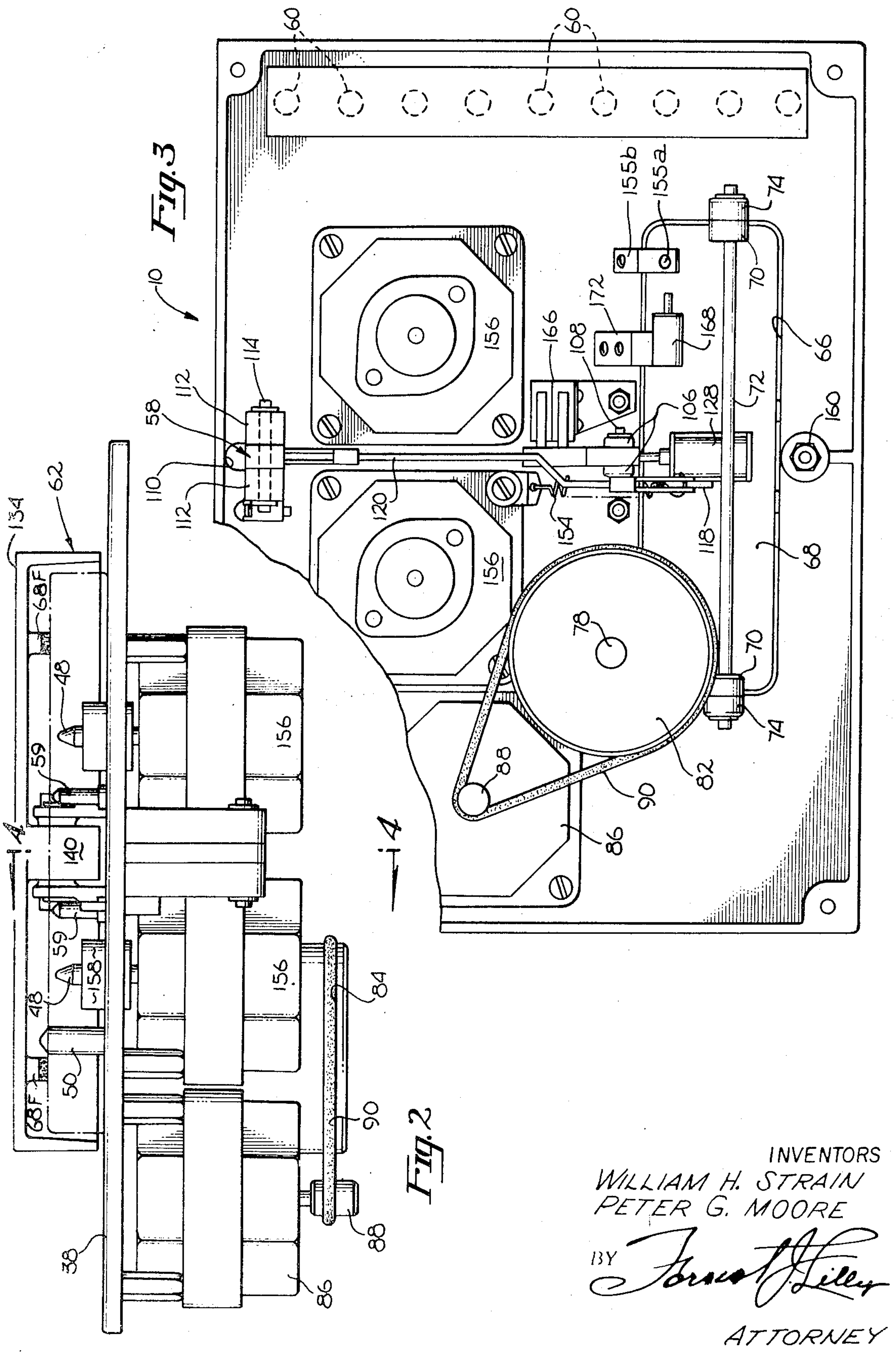
FIG. 2 is a rear elevation of the machine taken on line 2—2 in FIG. 1.
FIG. 3 is a bottom plan view of the machine.

Turning now to these drawings, there is illustrated a magnetic tape machine 10 according to the invention for use with a magnetic tape cartridge 12. The illustrated cartridge is that disclosed in the earlier mentioned copending application. Accordingly, it is unnecessary to describe this cartridge in explicit detail. Suffice it to say that the cartridge has an outer generally rectangular case 14 containing a pair of reels 16 spaced longitudinally of the case. A magnetic tape 18 has its ends secured to and wound on these reels. Tape 18 extends from one reel to the other along a prescribed path of motion which provides an exposed transcribing run 20 of the tape along the front longitudinal edge 22 of the cartridge. Contained within the rear portion of the cartridge case 14 are a pair of pivoted brake levers 24. These brake levers have overlapping ends exposed through an opening 28 in the rear edge of the cartridge. The opposite ends of the brake levers are spring loaded against the tape reels 16 to frictionally restrain these reels against rotation. In the side walls 30 of the cartridge case 14 are openings 32 through which the reel hubs 34 are exposed. Permanently mounted within the cartridge are tape tensioning springs 33.

The present magnetic tape machine 10 has a tape deck 36 including a base plate 38 mounted within a suitable housing. This base plate mounts a capstan drive 42, a magnetic transcriber 44, a cartridge brake release mechanism 46, and a pair of motor driven spindles 48. The capstan drive 42 and the magnetic transcriber 44 are located within the region to one side of a plane containing the rotation axes of the spindles 48. The brake release mechanism 46 is located within the region between and at the opposite side of the plane containing the spindle axes. Included in the capstan drive 42 are a motor driven capstan roller 50 and an opposing pinch roller 52. The magnetic transcriber 44 includes a magnetic head 54 and an opposing pinch pad 56. For convenience, the rollers 50, 52 of the capstan drive 42 and the magnetic head 54 and pinch pad 56 of the magnetic transcriber 44 are hereinafter referred to in places as tape engaging members. The brake release mechanism 46 has a movable brake operating member 58.

As will appear from the ensuing description, the tape machine 10 is constructed and arranged to receive the magnetic tape cartridge 12 in the transcribing position illustrated. In this position, the tape deck spindles 48 drivably engage the hub 34 of the cartridge reels 16 through the adjacent cartridge side wall openings 32. The exposed run 20 of the magnetic cartridge tape 18 is positioned between the tape engaging members 50, 52 and 54, 56 of the capstan drive 42 and the magnetic transcriber 44, respectively. The brake operating member 58 engages and presses forwardly against the overlapping ends of the cartridge brake levers 24 to retract these levers from contact with the cartridge reels 16 and thereby release the reels for free rotation. Rising from the base plate 38 are locating pins 59 which project through holes in the cartridge to locate the latter in the fore and aft direction.

The tape machine 10 is operable in various modes including record, replay, fast forward, and rewind modes. In each mode, the capstan drive roller 50 and/or the spindles 48 are driven by their respective motors to feed the exposed run 20 of magnetic cartridge tape 18 past the magnetic head 54. The machine is conditioned for its various operating modes by actuation of buttons 60 along one edge of the base plate 38.

According to the present invention, the tape-engaging members or rollers 50, 52 of the capstan drive 42 and tape engaging members of the magnetic transcriber 44, that is, the magnetic head 54 and pinch pad 56, are mounted on the base plate for relative retraction away from one another to cartridge loading positions and relative extension toward one another to normal operating positions. The brake operating member 58 is mounted on the base plate for rearward retraction to a cartridge loading position and forward extension to a brake releasing position. When the tape cartridge 12 is to be inserted into or removed from the tape machine 10, the tape engaging members of the capstan drive and magnetic transcriber are retracted to provide a relatively wide gap between the respective members. This permits the exposed run 20 of cartridge tape 18 to be easily inserted into and removed from the capstan drive and transcriber. The brake operating member 58 is retracted to clear the cartridge and thereby permit insertion of the cartridge by simply dropping the latter into place over the tape deck spindles 48. After installation of the cartridge, the tape-engaging members and brake operating member are returned to their extended operating positions to condition the tape machine 10 for operation.

According to another important feature of the invention, the capstan drive 42, magnetic transcriber 44, and brake release mechanism 46 are interconnected for extension and retraction of the respective members in unison. The particular inventive embodiment selected for illustration, for example, has a cover 62 hinged to the base plate 38. The cover is rotatable between a closed position, wherein the cover overlies the capstan drive 42 and transcriber 44, and an open position, wherein these parts are uncovered to permit insertion and removal of the tape cartridge. Linkage means 64 operatively connect the cover to the capstan drive 42, magnetic transcriber 44, and brake release mechanism 46 in a manner such that opening of this cover effects retraction, in unison, of the tape-engaging members 50, 52, 54, 56 and the brake operating member 58. Closing of the cover returns these members in unison to their normal operating positions. The brake operating member 58 and cover 62 have cartridge hold-downs 63R and 68F which overlie the rear and front edges of the cartridge 12 when the cover is closed to retain the cartridge in transcribing position. These hold-downs are retracted to clear the cartridge when the cover is opened.

Referring now in greater detail to the drawings, the base plate 38 contains a generally rectangular opening 66 adjacent and parallel to the front edge of the plate. Positioned within and generally complementing the plate opening 66 is a rock plate 68. A pair of lugs 70 depend from the underside of the rock plate slightly forward of its longitudinal centerline. Extending through these lugs, parallel to the centerline, is a pivot shaft 72. The ends of this shaft are journalled in lugs 74 depending from the underside of the base plate 38. Pivot shaft 72 pivotally supports the rock plate 68 on the base plate 38 for rotation about an axis below and forward of the longitudinal centerline of the rock plate. The rock plate is rotatable between a normal operating position (FIG. 4) flush with the base plate and an inclined retracted position (FIG. 5), wherein the rear edge of the rock plate is elevated above the base plate.

The capstan roller 50 is located above the base plate 38 along the rear edge and adjacent one end of the base plate opening 66. This roller is formed by the upper end of a shaft 78 rotatably supported in bearings in the base plate 38. Fixed to the lower end of the roller shaft 78, below the base plate, is a combined inertial wheel and pulley 82. This wheel contains a circumferential groove 84. Mounted on the underside of the base plate 38 is a motor 86 having a shaft pulley 88. Trained about the capstan pulley wheel 82, within the wheel groove 84, and the motor pulley 88 is a belt 90. Thus, the capstan roller 42 is driven from the motor 86.

The capstan drive pinch roller 52 is a rubber roller which is journalled on one end of a roller bracket 92. The opposite end of this bracket is pivotally mounted on the end of the rock plate 68 adjacent the capstan roller 50. The pivot axis of the roller bracket 92 is normal to the rock plate and parallel to the rotation axis of the pinch roller 52. Accordingly, when the rock plate 68 occupies its normal operating position of FIG. 4, the axes of the capstan roller 50 and pinch roller 52 are generally parallel. The pinch roller is located directly opposite the capstan roller, such that the bracket 92 supports the pinch roller for extension toward and retraction away from the capstan roller.

Mounted on the rock plate 68, opposite the free end of the roller bracket 92, is a solenoid 94. The plunger 96 of this solenoid engages the adjacent end of the pinch roller bracket 92. Energizing of the solenoid extends its plunger 96 to move the pinch roller 52 toward the capstan roller 50 against the action of a return spring (not shown). From this description, it will be understood that the return spring normally retracts the pinch roller away from the capstan roller to provide a gap between these rollers. Additional retraction of the pinch roller to increase the width of the gap between this roller and the capstan roller may be accomplished by upward rotation or retraction of the rock plate 68 from its normal position to its inclined cartridge loading position.

The magnetic head 54 of the magnetic transcriber 44 is mounted on the upper side of the rock plate 68 intermediate the ends and along the rear edge of this plate. To facilitate alignment of the magnetic head in a proper transcribing position relative to the cartridge tape, the upper side of the rock plate has a yoke-shaped boss 100 receiving the magnetic head with a snug fit. This boss positively locates the magnetic head in a fixed position relative to the rock plate. A second boss 100 on the rock plate receives an end-of-tape sensor or contactor 101.

The transcriber pinch pad 56 projects upwardly through a fore and aft slot 102 in the base plate 38. This slot is located along the rear edge of the rock plate opening 66 and directly opposite the magnetic head 54. The lower extending end of the pinch pad is enlarged to form a flat plate-like body 104 disposed in a fore and aft plane of the machine. Depending from the underside of the base plate at opposite sides of the pinch pad body are a pair of lugs 106. The pinch pad is pivotally supported on these lugs for rocking in a fore and aft direction of the base plate by a pivot pin 108. When the rock plate 68 occupies its normal operating position coplanar with the base plate 38 and the pinch pad 56 occupies its transcribing position (FIG. 4) normal to the base plate, the pad is generally parallel to the adjacent rear face of the magnetic head 54. It will be observed in FIG. 5 that relative retraction of the magnetic head 54 and pinch pad 56 to widen the intervening tape-receiving gap may be accomplished by upward rotation or retraction of the rock plate 68 to its cartridge loading position and rearward retraction of the pinch pad to its cartridge loading position.

Brake operating member 58 of the cartridge brake release mechanism 46 comprises an arm adjacent the rear edge of the base plate 38. This arm is located in a fore and aft plane of the base plate containing the magnetic head 54 and the pinch pad 56. The brake release arm extends upwardly through a fore and aft slot 110 in the base plate. Depending from the underside of the base plate on opposite sides of the arm are a pair of lugs 112. The lower end of the arm is pivotally supported on the lugs by a pivot pin 114. From this description, it will be seen that the cartridge brake operating arm 58 is supported on the base plate 38 for pivotal movement in a fore and aft direction of the base plate. On the upper end of the brake operating arm 58 is a cross-head or flange 116 which projects laterally of the arm to form the rear cartridge hold-down 63R.

Depending from the underside of the rock plate 68 is a torque arm 118. This torque arm is displaced laterally a short distance to one side of the common fore and aft plane containing the magnetic head 54, pinch pad 56, and brake operating arm 58. The lower end of the rock plate torque arm 118 is connected to the lower end of the brake operating arm 58 by a link 120. This link includes a central rod threadedly joined at its ends to clevises which straddle and are pivotally attached to the torque arm and brake operating arm, respectively. Link 120 is thus adjustable in length. The lower end of the brake operating arm is pivotally connected to the lower body 104 of the transcriber pinch pad 56 by a link 122 similar to the link 120. Link 122 connects the brake operating arm and pinch pad in a manner such that the arm and pad extend and retract in unison. However, it is significant to note here that the front end of the link 122 is attached to the pinch pad body 104 by a lost motion pivotal connection 124. A spring 126 urges the pinch pad 56 toward the magnetic head 54.

It is evident from the description to this point that rotation of the rock plate 68 about its pivot axis effects extension and retraction, in unison, of the pinch roller 52 and magnetic head 54 toward and away from the capstan roller 50 and pinch pad 56, respectively, and concurrent extension and retraction of the brake operating arm 58. More specifically, upward rotation or retraction of the rock plate from its normal operating position retracts the pinch roller and magnetic head upwardly and forwardly from the capstan roller and pinch pad, respectively, to forward cartridge loading positions. This rotation of the rock plate acts through the link 122 to concurrently retract the brake operating arm 58 rearwardly to a rear cartridge loading position. Finally, rearward retraction of the brake operating arm acts through the link 122 to retract the pinch pad 56 rearwardly from the magnetic head 54 to a rear cartridge loading position. Extension of the rock plate 68 to its normal operating position flush with the base plate 38 returns the rollers of the capstan drive, the magnetic head and pinch pad of the magnetic transcriber, and the brake operating arm to their operating positions in unison.

Mounted on the underside of the rock plate 68, directly opposite the lower body 104 of the pinch pad 56, is a solenoid 128 having a plunger 130. Energizing of the solenoid 128, with the rock plate in normal position, extends the solenoid plunger 130 rearwardly against the pinch pad body to retract the pinch pad 56 rearwardly away from the magnetic head 54 against the action of the pinch pad spring 126.

Rock plate 68 is operatively connected to the tape deck cover 62 in a manner such that closing the cover rotates the plate to its operating position flush with the base plate 38. Opening the cover rotates the rock plate upwardly to its retracted position. Thus, opening the cover 62 retracts to their cartridge loading positions, the tape engaging members of the capstan drive 42 and magnetic transcriber 44 and the brake operating member 58 of the cartridge brake release mechanism 46, thereby to condition the tape machine for insertion and removal of the tape cartridge 12. Closing the cover returns these members to their normal operating positions to condition the tape machine for operation. To these ends, the rock plate 68 is provided with a pair of cover hinge arms 132. These hinge arms are integrally joined to the upper side of the rock plate midway between its ends and adjacent the front edge of the plate. The arms incline upwardly and forwardly at an oblique angle relative to the rock plate to locate the forward extremities of the arms beyond and above the front edge of the plate. Cover 62 has a top wall 134 bounded along its front and side edges by depending flanges 136 and 138. Depending from the underside of the cover top wall 134, intermediate the ends of the cover, is an eccentric cam formation 140. This cam formation, or cam as it will be hereinafter referred to, is integrally joined to the front cover flange 136 in the region immediately adjacent the cover top wall 134.

Cam 130 fits slidably between the front ends of the rock plate hinge arms 132. The cam is pivotally attached to these arms by a pivot pin 142 parallel to the rock plate pivot shaft 72. About the lower end of this cam is an arcuate cam surface 144 which is generated by movement, about the axis of the pivot pin 142, of a line generatrix parallel to the latter axis.

Depending from the underside of the base plate 38, directly below the cover cam 140, is a boss 146. An adjustment screw 148 is threaded in this boss. The axis of the adjustment screw is normal to the base plate. The upper end of the adjustment screw 148 projects into a slot or recess in the upper surface of the base plate 38, parallel to the axis of the cover pivot pin 142. Contained within this recess is a bearing roller 152. Roller 152 sears at its underside against the upper end of the adjustment screw 148 and at its upper side against the cam surface 144 of the cover cam 140. During rotation of the cover 62 between its closed position of FIG. 4 and its open position of FIG. 5, the region of engagement of the roller 152 with the cam surface 144 moves along the surface from *a* to *b*. The radius of curvature of the cam surface progressively decreases from *a* to *b* and hence progressively increases from *b* to *a*.

Connected to the lower end of the depending rock plate torque arm 118 is a spring 154 which exerts a rearward thrust on the arm. Spring 154 thus urges the rock plate 68 from its normal position flush with the base plate 38 to its upper inclined cartridge loading position. This spring bias on the rock plate, in turn, yieldably urges the cover cam 140 against its bearing roller 152.

Figure 4:
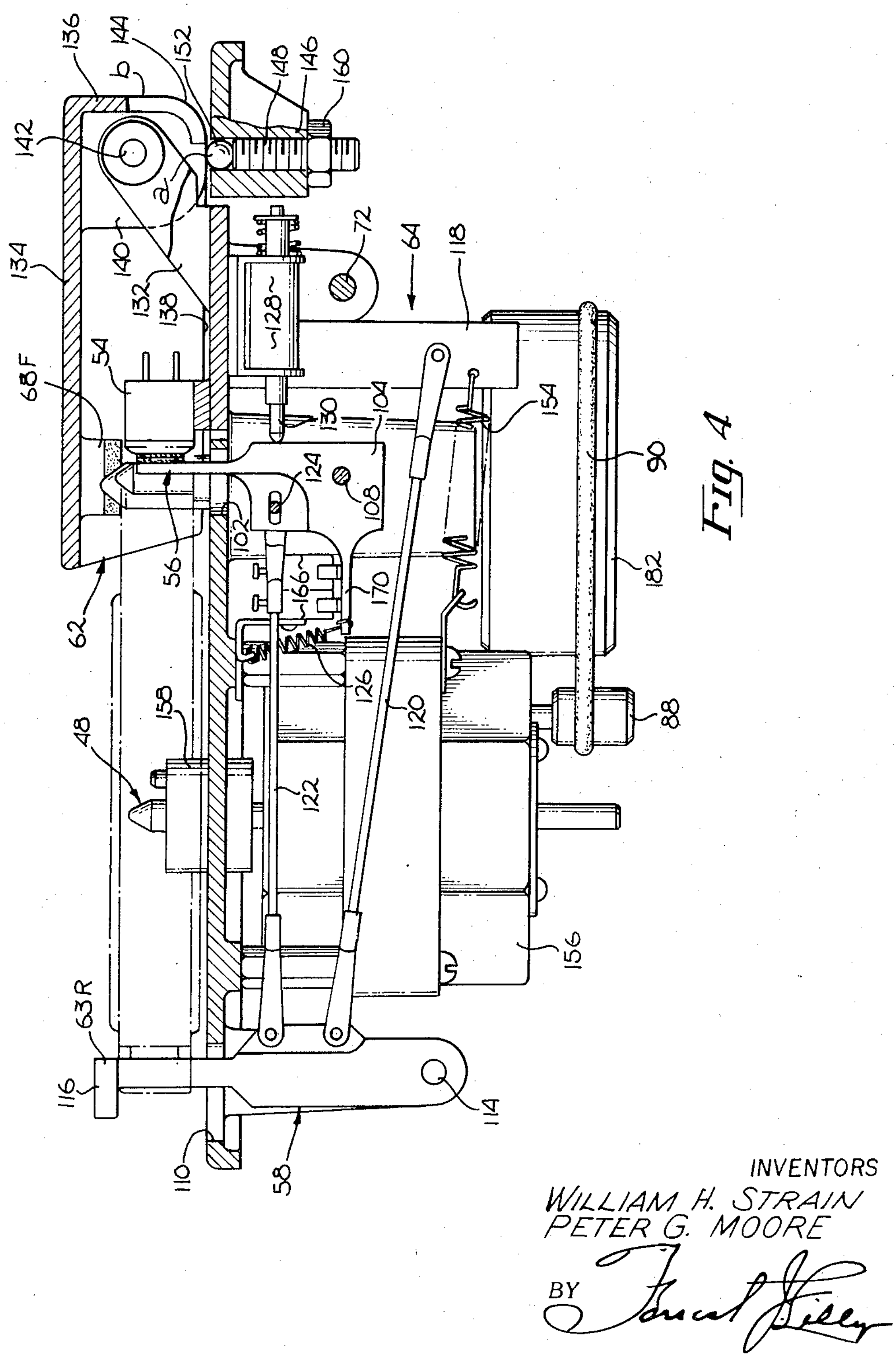
FIG. 4 is an enlarged section taken on line 4—4 in FIG. 2 showing the machine in normal operating condition.
Figure 5:
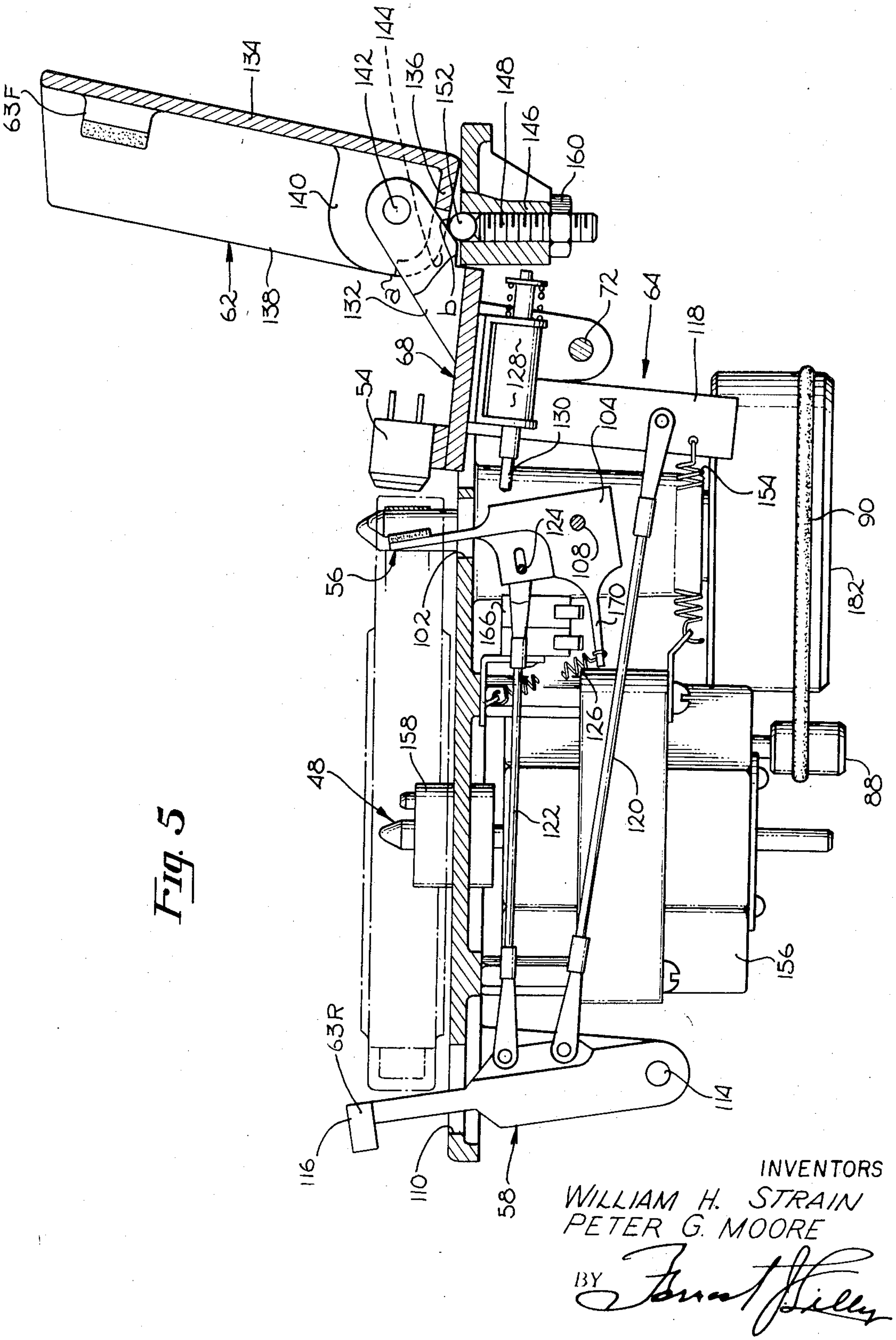
FIG. 5 is a section similar to FIG. 4 showing the machine in cartridge loading condition.

From the foregoing description, it is evident that rotation of the cover 62 to its closed position produces an upward camming force on the forward ends of the rock plate cover hinge arms 132 and thereby rotates the rock plate 68 toward its normal position of FIG. 4 against the bias of the rock plate spring 154. Rotation of the cover to its open position permits upward rotation of the rock plate toward its retracted cartridge loading position of FIG. 5. In its normal position, the rock plate engages an adjustable stop screw **155*a* carried by a boss 155*b* on the base plate 38. The bearing roller adjustment screw 148 and rock plate stop screw 155*a* are set so that the pinch roller 52 and magnetic head 54** occupy their proper operating positions when the cover is closed.

It will now be understood that opening of the cover 62 effects simultaneous relative retraction of the tape-engaging members, i.e., rollers 50, 52, of the capstan drive 42 and the tape-engaging members, i.e., magnetic head and pinch pad 54, 56, of the magnetic transcriber 44, away from one another to their cartridge loading positions. Opening movement of the cover simultaneously retracts the brake release member 58 from its cartridge brake release position to its cartridge loading position to permit installation and removal of the tape cartridge 12. Closing of the cover returns these members in unison to their extended operating positions.

The tape reel spindles 48 of the tape machine 10 are situated approximately equal distances to opposite sides of and are disposed in a common plane normal to the fore and aft plane of the tape machine containing the magnetic head 54, pinch pad 56, and brake release member 58. Mounting on the underside of the base plate are motors 156 for driving the spindles. The spindles have upper coupling ends 158 which project above the base plate 38 and are shaped to mate in driving engagement with the hubs 34 of the cartridge tape reel 16.

In use of the tape machine 10, the cover 62 is opened and the tape cartridge 12 is placed in transcribing position on the tape deck. In this position, the cartridge seats flat against the base plate 38 and the cartridge tape reels 16 drivably engage the coupling ends 158 of the machine spindles 48. The exposed cartridge tape run 20 is positioned between the tape-engaging members 50, 52 and 54, 56 of the capstan drive 42 and magnetic transcriber 44. Since these tape-engaging members, and the cartridge brake release member 58, are currently retracted to their cartridge loading positions, the tape cartridge 12 may be quickly and easily installed by simply dropping the cartridge into place on the tape deck. After installation of the tape cartridge, the cover 62 is closed to return the members to their operating positions. In these operating positions, the rollers 50, 52 of the capstan drive 42 are disposed to frictionally grip the exposed cartridge tape run 20 when the pinch roller solenoid 94 is energized. The pinch pad 56 of the magnetic transcriber 44 presses the exposed tape run 20 against the opposing magnetic head 54. The brake operating member 58 of the cartridge brake release mechanism 46 engages and presses forwardly against the cartridge brake levers 24 to retract these levers form contact with the cartridge tape reels 16. It is significant to note here that rotation of the cover cam roller adjustment screw 148 adjusts the magnetic head 54 laterally of the magnetic tape 18. This screw is set to center the head relative to the magnetic tape. The adjustment screw is then locked in position by a jam nut 160.

As noted earlier, the brake operating member 58 has a rear cartridge hold-down or retaining flange 63R. This flange engages over the rear edge of the tape cartridge 12 to hold the rear portion of the cartridge against the base plate 38 when the operating arm occupies its forward brake release or operating position. The front cartridge hold-down 63F on the cover 62 is a depending padded boss on the underside of the cover which presses downwardly on the front edge of the cartridge when the cover is closed to hold the front portion of the cartridge against the base plate.

As noted earlier, the tape machine 10 is conditioned for its various operating modes, i.e., record, play, fast forward, and rewind, by selective actuation of the mode select buttons 60. The electrical circuitry of the tape machine, whereby these various operating modes are accomplished, and the operation of the tape machine in each mode is generally conventional. Accordingly, it is unnecessary to describe the circuitry and operating modes in explicit detail. Suffice it to say that in the record and replay modes, the capstan motor 86 is energized and the capstan pinch roller solenoid 94 is energized to press the cartridge tape 18 firmly against the capstan roller. The tape is thereby driven at a constant transcribing speed past the magnetic head 54. In the record and replay modes, the pinch pad 56 is biased toward the head by the pinch pad spring 126 to press the tape against the head. The spindle motors 156 are energized to wind the magnetic tape on the left-hand take-up reel 16 of the tape cartridge 12 and to exert a light retarding force on the right-hand supply reel of the cartridge for maintaining a constant tension in the exposed tape run 20. The tape tensioning springs in the cartridge aid this tape tensioning action.

In the rewind and high-speed forward modes of the tape machine, the capstan pinch roller solenoid 94 is deenergized to effect retraction of the capstan pinch roller 52 by its return spring. The transcriber pinch pad solenoid 128 is energized to retract pinch pad 56 away from the magnetic head 54 against the action of the pinch pad spring 126 to the rear limit of the lost motion connection 124 between the pinch pad and its operating link 122. Spindle drive motors 156 are energized to wind the magnetic tape 18 on the cartridge take-up or supply reel, as the case may be, and to exert a light retarding force on the other reel.

As noted above, the electrical circuitry of the tape machine 10 for effecting operation of the machine in its various modes is generally conventional and will not be explained in detail. However, certain elements of this circuitry are worthy of note. These elements are microswitches 166 and 168. Switch 166 is mounted on the base plate 38 for actuation by an arm 170 extending rearwardly from the lower pinch pad plate 104. Rearward retraction of the pinch pad 56 by the solenoid 128 in the fast forward and rapid rewind modes releases the switch 166 to inactivate the tape erase circuit of the tape machine. Switch 168 is mounted on a bracket 172 underlying the rear edge of the rock plate 68. This switch is arranged to be actuated by the rock plate when the latter occupies its normal operating position flush with the base plate 38. Switch 168 serves as an interlock switch which inactivates the tape machine against operation except when the rock plate is in operating position.

We claim:

1. A magnetic tape machine for use with a magnetic tape cartridge containing a pair of tape reels and a magnetic tape extending between said reels along a prescribed path of movement providing an exposed run of tape along the front edge of said cartridge, said machine comprising:

a tape deck including a base plate for receiving said cartridge in a transcribing position;

a pair of motor-driven spindles on said base plate having coupling ends exposed above said plate for driving engagement with said cartridge reels;

a capstan drive including a motor-driven capstan roller member and an opposing pinch roller member above said base plate at one side of a plane containing said spindles for straddling said exposed cartridge tape run, and means supporting said roller members on said base plate for relative movement toward one another to extended operating positions and away from one another to retracted cartridge loading positions;

a magnetic transcriber including a magnetic head member and an opposing pinch pad member above said base plate at said one side of said plane for straddling said exposed cartridge tape run, and means supporting said head member and pad member for relative movement toward one another to extended operating positions and away from one another to retracted cartridge loading positions; and means interconnecting said members for relative extension and retraction movement of said members in unison, said cartridge includes a pair of spring-loaded brake levers engageable with said cartridge reels for restraining the reels against turning and having ends exposed through an opening in the rear edge of the cartridge against which an inward pressure is adapted to be exerted to retract said levers from said reels;

said tape machine includes a cartridge brake operating member above said base plate at the opposite side of said plane, and means supporting said operating member on said base plate for movement toward said plane to an extended brake lever engaging and releasing position and away from said plane to retracted cartridge loading position; and said interconnecting means are connected to said brake operating member for extension and retraction of said brake operating member in unison with extension and retraction of said capstan drive members and transcribing members, wherein:

said tape machine includes front and rear cartridge hold-down members above said base plate at opposite sides of said plane, and means supporting said hold-down members on said base plate for movement toward said plane to extended cartridge retaining positions and away from said plane to retracted cartridge loading positions;

said interconnecting means are connected to said cartridge hold-down members for extension and retraction of said hold-down members in unison with extension and retraction of said capstan drive, transcriber, and brake operating members; and said hold-down members are disposed to engage over the front and rear edges of said cartridge to retain the cartridge in transcribing position on said tape deck when said hold-down members occupy their extended positions and to clear said cartridge when said hold-down members occupy their retracted positions.

2. A magnetic tape machine according to claim 1 wherein:

said interconnecting means comprises a part which is movable by hand to effect unified extension and retraction of said members.

3. A magnetic tape machine according to claim 2 wherein:

said front hold-down member is carried by said part and said rear hold-down member is carried by said brake operating member.

4. A magnetic tape machine according to claim 3 wherein:

said part comprises a cover which overlies said capstan drive and transcriber when said members occupy their extended positions and exposes said capstan drive and transcriber when said members occupy their retracted positions.

5. A magnetic tape machine for use with a magnetic tape cartridge containing a pair of tape reels and a magnetic tape extending between said reels along a prescribed path of movement providing an exposed run of tape along the front edge of said cartridge, said machine comprising:

a tape deck including a base plate for receiving said cartridge in a transcribing position;

a pair of motor-driven spindles on said base plate having coupling ends exposed above said plate for driving engagement with said cartridge reels;

a capstan drive including a motor-driven capstan roller member and an opposing pinch roller member above said base plate at one side of a plane containing said spindles for straddling said exposed cartridge tape run, and means supporting said roller members on said base plate for relative movement toward one another to extended operating positions and away from one another to retracted cartridge loading positions;

a magnetic transcriber including a magnetic head member and an opposing pinch pad member above said base plate at said one side of said plane for straddling said exposed cartridge tape run, and means supporting said head member and pad member for relative movement toward one another to extended operating positions and away from one another to retracted cartridge loading positions; and means interconnecting said members for relative extension and retraation movement of said members in unison;

wherein:

said tape machine includes a front cartridge hold-down member at said one side of said plane and a rear cartridge hold-down member at the opposite side of said plane, and means supporting said hold-down members on said base plate for movement toward said plane to extended cartridge retaining positions, wherein said hold-down members are disposed to overlie the front and rear edges of said cartridge to retain the cartridge in transcribing position on said tape deck, and away from said plane to retracted position, wherein said hold-down members are disposed to clear said cartridge for insertion and removal of the cartridge; and said interconnecting means are connected to said hold-down members for extension and retraction of said hold-down members in unison with extension and retraction of said capstan drive and transcribing members.

6. A magnetic machine according to claim 5 wherein:

said interconnecting means comprises a part which is movable by hand to effect unified extension and retraction of the said members.

7. A magnetic tape machine for use with a magnetic tape cartridge containing a pair of tape reels and a magnetic tape extending between said reels along a prescribed path of movement providing an exposed run of tape along the front edge of the cartridge, said machine comprising:

a tape deck for receiving said cartridge in transcribing position and including a base plate;

a pair of motor-driven spindles on said base plate having cartridge reel engaging ends exposed above said plate for driving engagement with said cartridge reels;

a capstan drive including a motor-driven capstan roller member and an opposing pinch roller member above said base plate at one side of a plane containing said spindles for straddling said exposed cartridge tape run;

a magnetic transcriber including a magnetic head member and an opposing pinch pad member above said base plate at said one side of said plane for straddling said exposed cartridge tape run;

means supporting one capstan drive member and one transcriber member on said base plate;

a movable plate mounting the other capstan drive member and other transcriber member; and means supporting said movable plate on said base plate for movement of said other capstan drive and transcriber members in unison toward and away from the base plate mounted capstan drive and transcriber members between extended operating positions adjacent the latter members and retracted cartridge loading positions remote from the latter members;

wherein:

said cartridge includes a pair of spring-loaded brake levers engageable with said cartridge reels for restraining the reels against turning and having ends exposed through an opening in the rear edge of said cartridge against which an inward pressure may be exerted to retract said levers from said reels;

said tape machine includes a cartridge brake operating member above said base plate at the opposite side of said plane, and means supporting said brake operating member on said base plate for movement toward said plane to an extended brake lever engaging and releasing position and away from said plane to a retracted cartridge loading position; and means interconnecting said movable plate and brake operating member for extension and retraction of said brake operating member and said movable plate mounted members in unison.

8. A magnetic tape machine according to claim 7 wherein:

said tape machine includes front and rear cartridge hold-down members above said base plate at opposite sides of said plane movable toward said plane to extended cartridge retaining positions and away from said plane to retracted cartridge loading positions;

said interconnecting means are operatively connected to said cartridge hold-down members, for extension and retraction of said hold-down members in unison with extension and retraction of said brake operating member and said movable plate mounted members; and said hold-down members being disposed to engage over the front and rear edges of said cartridge to retain the cartridge in transcribing position when said hold-down members occupy their extended positions.

9. A magnetic tape machine for use with a magnetic tape cartridge containing a pair of tape reels and a magnetic tape extending between said reels along a prescribed path of movement providing an exposed run of tape along the front edge of the cartridge, said machine comprising:

a tape deck for receiving said cartridge in transcribing position and including a base plate;

a pair of motor-driven spindles on said base plate having cartridge reel engaging ends exposed above said plate for driving engagement with said cartridge reels;

a capstan drive including a motor-driven capstan roller member and an opposing pinch roller member above said base plate at one side of a plane containing said spindles for straddling said exposed cartridge tape run;

a magnetic transcriber including a magnetic head member and an opposing pinch pad member above said base plate at said one side of said plane for straddling said exposed cartridge tape run;

means supporting one capstan drive member and one transcriber member on said base plate;

a movable plate mounting the other capstan drive member and other transcriber member; and means supporting said movable plate on said base plate for movement of said other capstan drive and transcriber members in unison toward and away from the base plate mounted capstan drive and transcriber members between extended operating positions adjacent the latter members and retracted cartridge loading positions remore from the latter members;

wherein:

said cartridge includes a pair of spring-loaded brake levers engageable with said cartridge reels for restraining the reels against turning and having ends exposed through an opening in the rear edge of the cartridge against which an inward pressure may be exerted to retract the levers from said reels;

said tape machine includes a cartridge brake operating member above said base plate at the opposite side of said plane, and means supporting said operating member on said base plate for movement toward said plane to an extended brake lever engaging and releasing position and away from said plane to a retracted cartridge loading position;

said magnetic head member and pinch roller member are mounted on said movable plate;

said pinch pad member is mounted on said base plate for extension and retraction toward and away from said head member independently of movement of said movable plate; and means interconnecting said movable plate, brake operating member, and pinch pad member for extension and retraction of said movable plate mounted members, said brake operating member, and said pinch pad member

10. A magnetic tape machine according to claim 9 wherein:

said movable plate is a rock plate, pivoted on said base plate; and said brake operating member and pinch pad member are pivoted on said base plate.

11. A magnetic tape machine for use with a magnetic tape cartridge containing a pair of tape reels and a magnetic tape extending between said reels along a prescribed path of movement providing an exposed run of tape along the front edge of the cartridge, said machine comprising:

a tape deck for receiving said cartridge in transcribing position and including a base plate;

a pair of motor-driven spindles on said base plate having cartridge reel engaging ends exposed above said plate for driving engagement with said cartridge reels;

a capstan drive including a motor-driven capstan roller member and an opposing pinch roller member above said base plate at one side of a plane containing said spindles for straddling said exposed cartridge tape run;

a magnetic transcriber including a magnetic head member and an opposing pinch pad member above said base plate at said one side of said plane for straddling said exposed cartridge tape run;

means supporting one capstan drive member and one transcriber member on said base plate;

a movable plate mounting the other capstan drive member and other transcriber member; and means supporting said movable plate on said base plate for movement of said other capstan drive and transcriber members in unison toward and away from the base plate mounted capstan drive and transcriber members between extended operating positions adjacent the latter members and retracted cartridge loading positions remote from the latter members;

said movable plate is a rock plate pivoted on said base plate on an axis parallel to said plane and base plate;

a cover hinged to said rock plate on a pivot axis parallel to and laterally displaced from the pivot axis of said rock plate, a cam on said cover having an eccentric cam surface generated about said cover pivot axis, bearing means on said base plate engaging said cam surface, and a spring for yieldably urging said cam surface against said bearing means;

said cover being rotatable between a closed position over said rock plate wherein said cover overlies said capstan drive and transcriber and an open position wherein said cover exposes said capstan drive and transcriber; and said cam surface being shaped to rotate said rock plate in directions to cause extension of said rock plate mounted members upon closing of said cover and retraction of the latter members upon opening of said cover wherein:

said cartridge includes a pair of spring-loaded brake levers engageable with said cartridge reels for restraining the reels against turning and having ends exposed through an opening in the rear edge of said cartridge against which an inward pressure may be exerted to retract said levers from said reels;

said tape machine includes a cartridge brake operating member above said base plate on the opposite side of said plane, and means supporting said operating member on said base plate for movement toward said plane to an extended brake lever engaging and releasing position and away from said plane to a retracted cartridge loading position;

means interconnecting said rock plate and brake operating member for extension and retraction of said brake operating member and said rock plate mounted members in unison in response to rotation of said cover between open and closed positions; and said cover and brake operating member including cartridge hold-downs which are disposed to overlie the front and rear edges of said cartridge to retain the latter in transcribing position on said tape deck when said cover is closed and said brake operating member is extended and to clear said cartridge when said cover is open and said brake operating member is retracted.

* * * * *